(12) United States Patent
Herlands et al.

(10) Patent No.: US 12,341,896 B2
(45) Date of Patent: Jun. 24, 2025

(54) SYSTEM, DEVICE, AND METHOD OF PRIVACY-PRESERVING USER-IDENTITY VERIFICATION AND RE-PROOFING

(71) Applicant: IRONVEST, INC., New York, NY (US)

(72) Inventors: William Herlands, Cambridge, MA (US); Erez Zohar, Hoboken, NJ (US); Avi Turgeman, New York, NY (US)

(73) Assignee: IRONVEST, INC., New York, NY (US)

( * ) Notice: Subject to any disclaimer, the term of this patent is extended or adjusted under 35 U.S.C. 154(b) by 132 days.

(21) Appl. No.: 18/277,994

(22) PCT Filed: Mar. 15, 2022

(86) PCT No.: PCT/US2022/020288
§ 371 (c)(1),
(2) Date: Aug. 20, 2023

(87) PCT Pub. No.: WO2022/203897
PCT Pub. Date: Sep. 29, 2022

(65) Prior Publication Data
US 2024/0323022 A1    Sep. 26, 2024

Related U.S. Application Data
(60) Provisional application No. 63/163,889, filed on Mar. 21, 2021.

(51) Int. Cl.
*H04L 9/32* (2006.01)
*G06F 21/31* (2013.01)
*G06F 21/62* (2013.01)

(52) U.S. Cl.
CPC .......... *H04L 9/3231* (2013.01); *H04L 9/3213* (2013.01); *H04L 9/3236* (2013.01)

(58) Field of Classification Search
CPC ... H04L 9/3231; H04L 9/3213; H04L 9/3236; H04L 2209/42; H04L 9/3239; G06F 21/31; G06F 21/6245
See application file for complete search history.

(56) References Cited

U.S. PATENT DOCUMENTS
10,135,834 B1 * 11/2018 Galebach ............... G06Q 10/10
10,990,600 B1 *  4/2021 Bose ................. G06F 16/24578
(Continued)

OTHER PUBLICATIONS
International Search Report in PCT/US2022/020288, dated Jul. 7, 2022.
(Continued)

*Primary Examiner* — Darren B Schwartz
(74) *Attorney, Agent, or Firm* — AlphaPatent Associates Ltd.; Daniel J. Swirsky

(57) ABSTRACT

System, device, and method of privacy-preserving user-identity verification and re-proofing. A system includes a Tokenization Unit, that is configured to receive from a user a user-submitted biometric data-item of the user; to receive from the user one or more user-submitted data-items of Personally Identifiable Information (PII); to generate an aggregated data-item that includes (i) at least a portion of the user-submitted biometric data-item and (ii) at least a portion of the one or more user-submitted data-items of Personally Identifiable Information (PII); and to perform irreversible one-way cryptographic hashing of the aggregated data-item into an irreversible tokenized data-item that enables user authentication based on biometric data and PII data.

13 Claims, 1 Drawing Sheet

(56) References Cited

U.S. PATENT DOCUMENTS

| | | | |
|---|---|---|---|
| 11,238,383 B2* | 2/2022 | Mansour | G06Q 10/06393 |
| 11,301,586 B1* | 4/2022 | Poh | G06F 21/6254 |
| 12,219,069 B1* | 2/2025 | Griffin | H04L 9/0825 |
| 2003/0091218 A1* | 5/2003 | Hamid | G06V 40/1347 |
| | | | 340/5.53 |
| 2004/0158724 A1* | 8/2004 | Carr | G06F 21/31 |
| | | | 713/186 |
| 2004/0162984 A1* | 8/2004 | Freeman | H04L 9/3268 |
| | | | 713/176 |
| 2005/0132194 A1* | 6/2005 | Ward | G06Q 20/341 |
| | | | 713/176 |
| 2006/0273152 A1* | 12/2006 | Fields | G06Q 20/40 |
| | | | 235/380 |
| 2009/0287930 A1* | 11/2009 | Nagaraja | H04L 9/3073 |
| | | | 380/255 |
| 2011/0313925 A1* | 12/2011 | Bailey, Jr. | G06Q 40/02 |
| | | | 705/44 |
| 2013/0086641 A1* | 4/2013 | Mehr | G06Q 50/01 |
| | | | 726/4 |
| 2014/0297528 A1* | 10/2014 | Agrawal | G06Q 20/40145 |
| | | | 705/44 |
| 2014/0365782 A1* | 12/2014 | Beatson | G06V 30/1478 |
| | | | 713/186 |
| 2015/0318994 A1* | 11/2015 | Walsh | G06F 21/32 |
| | | | 713/182 |
| 2016/0277424 A1* | 9/2016 | Mawji | G06Q 20/4016 |
| 2017/0053281 A1* | 2/2017 | Howe | G06Q 20/322 |
| 2017/0344760 A1* | 11/2017 | Jennings | G06F 21/75 |
| 2018/0091505 A1* | 3/2018 | Farrell | H04L 63/062 |
| 2018/0262493 A1* | 9/2018 | Andrade | G06F 21/31 |
| 2018/0332068 A1 | 11/2018 | Moynahan | |
| 2019/0220583 A1 | 7/2019 | Douglas | |
| 2020/0042685 A1* | 2/2020 | Tussy | G06V 40/50 |
| 2020/0065463 A1* | 2/2020 | Ryu | G06V 40/18 |
| 2020/0145219 A1* | 5/2020 | Sebastian | H04L 9/50 |
| 2020/0322155 A1* | 10/2020 | Cohen | H04L 9/3247 |
| 2020/0366671 A1 | 11/2020 | Larson | |
| 2021/0075788 A1* | 3/2021 | Pasterk | H04L 9/3239 |
| 2021/0110015 A1* | 4/2021 | McCarty | G06F 21/32 |
| 2021/0117524 A1* | 4/2021 | McKell-Redwood | |
| | | | H04L 9/3231 |
| 2021/0288812 A1* | 9/2021 | Tang | H04L 9/3236 |
| 2021/0328776 A1* | 10/2021 | Fleck | H04L 9/0894 |
| 2022/0164478 A1* | 5/2022 | Fleck | G06F 21/6227 |
| 2024/0242218 A1* | 7/2024 | Almeida | G06Q 20/3227 |

OTHER PUBLICATIONS

Written Opinion of the International Searching Authority in PCT/US2022/020288, dated Jul. 7, 2022.

* cited by examiner

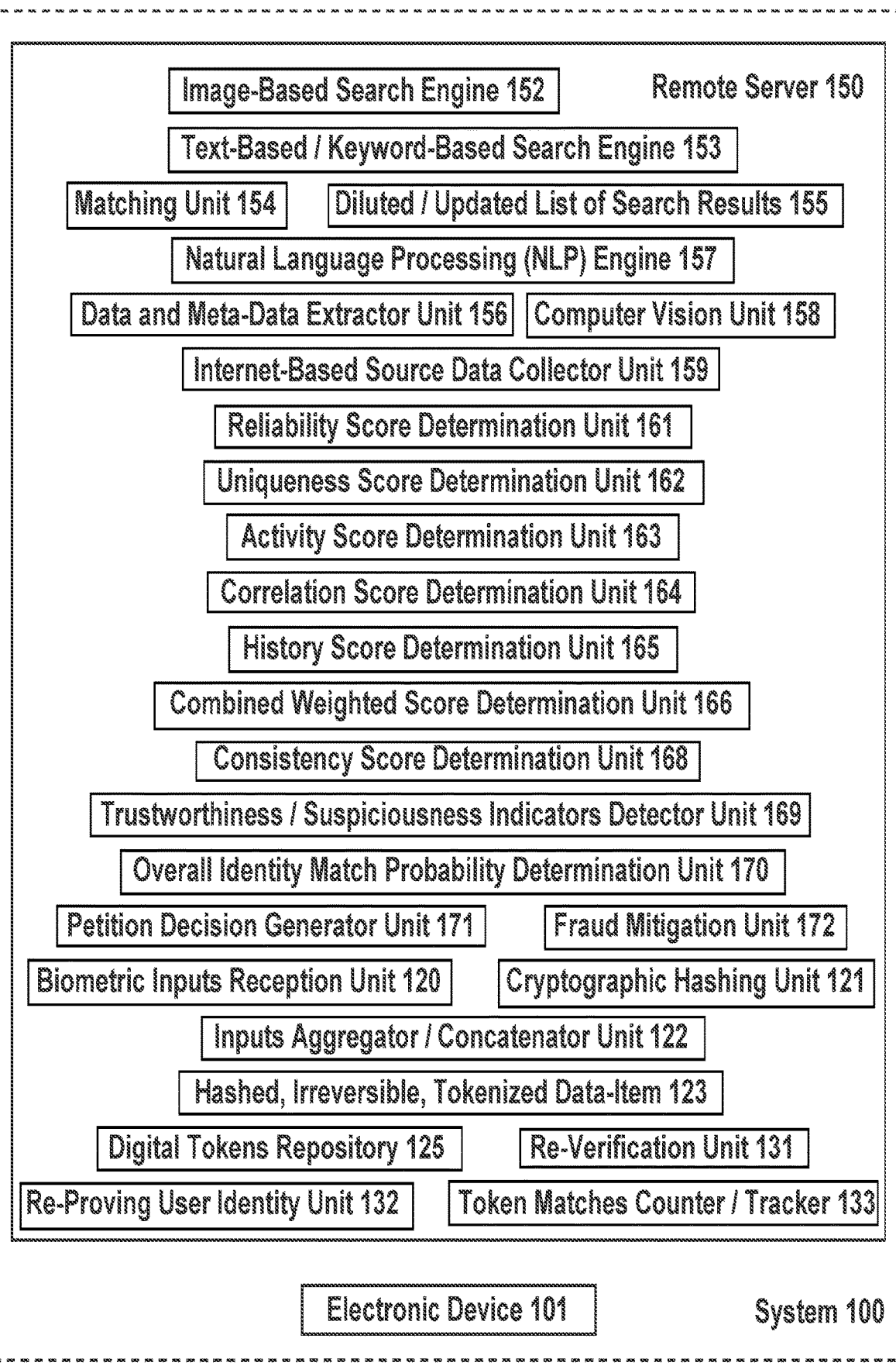

SYSTEM, DEVICE, AND METHOD OF PRIVACY-PRESERVING USER-IDENTITY VERIFICATION AND RE-PROOFING

CROSS-REFERENCE TO RELATED APPLICATIONS

This patent application is a National Stage of PCT international application number PCT/US2022/020288, having an international filing date of Mar. 15, 2022, published as WO 2022/203897 A1, which is hereby incorporated by reference in its entirety; which claims benefit and priority from U.S. 63/163,889, filed on Mar. 21, 2021, which is hereby incorporated by reference in its entirety.

FIELD

The present invention is related to the field of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments include devices, systems, and methods of privacy-preserving user-identity verification and re-proofing. For example, a system includes a Tokenization Unit, that is configured to receive from a user a user-submitted biometric data-item of the user; to receive from the user one or more user-submitted data-items of Personally Identifiable Information (PII); to generate an aggregated data-item that includes (i) at least a portion of the user-submitted biometric data-item and (ii) at least a portion of the one or more user-submitted data-items of Personally Identifiable Information (PII); and to perform irreversible one-way cryptographic hashing of the aggregated data-item into an irreversible tokenized data-item that enables user authentication based on biometric data and PII data.

Some embodiments may provide other and/or additional benefits or advantages.

BRIEF DESCRIPTION OF THE DRAWINGS

FIG. 1 is a schematic block diagram illustration of a system, in accordance with some demonstrative embodiments.

DETAILED DESCRIPTION OF SOME DEMONSTRATIVE EMBODIMENTS

Some embodiments provide systems and methods for authenticating users and/or verifying transactions, while preserving user privacy and utilizing identity items that are obtained from the Internet and/or from third-party repositories. Some embodiments provide privacy-preserving Internet-identity based verification and/or authentication systems and methods.

For example, the system uses facial biometric (e.g., an image or a video of the user, or a biometric trait or biometric data-item that is extracted from an image or a video or a video-frame), combined with other information about that person (e.g., data provided by the user as part of account creation or profile creation or submission of transaction), in order to identify and find one or more Internet-based sources (or online sources, or sources or repositories that may be accessed over HTTP or HTTPS or TCP/IP or over an Internet connection) about that person which include the person's face in a picture or in a video. The system then analyzes the Internet-based source(s), in addition to or in combination with the information provided by the person and/or with data obtained from or provided by third party source(s) or repositories (e.g., public and/or private and/or governmental and/or proprietary), in order to assess or estimate or quantify the likelihood (or the level of certainty) that the person is indeed who he (or she) claims to be.

Reference is made to FIG. 1, which is a schematic block diagram illustration of a system 100, in accordance with some demonstrative embodiments. System 100 may be implemented using suitable hardware components and/or software components.

For example, the user Adam Brown utilizes an Electronic Device 101 (e.g., a desktop computer, a laptop computer, a tablet, a smartphone) to access a computerized service, or particularly, to access or to interact with a Remote Server 150. For example, User Adam is requesting to open a new bank account or a new brokerage account or a new securities account; or is applying for a new credit card; or is applying for a mortgage or a loan; or is applying to be accepted as a student in an academic institution; or is applying for a job; or the like. User Adam is asked (e.g., via a website or web-page, or via an application or "app") to fill out a form (e.g., an application form, a request form, a petition form, a query form) using his Electronic Device 101, and the form's content is submitted over the Internet to Remote Server 150 for processing. In some embodiments, some or all of the personal information may be provided by User Adam explicitly (e.g., by typing data into fields of the form); and/or may be extracted or obtained in other ways. For example, User Adam may be requested to upload an image of the front side and/or the back side of his driver's license, and the Remote Server may analyze the image(s) to extract from them data such as first name, family name, date of birth, gender, or the like; for example, by performing Optical Character Recognition (OCR) on text that appears in the driver's license, or by applying an algorithm that reads or deciphers or extracts textual information from a graphical code (e.g., a QR code) which may be embedded into such driver's license or other instrument. Additionally or alternatively, some or even all of the information may already be known to Remote Server 150; for example, User Adam already has a checking account with Bank-A, and now applies to receive a credit card or a loan or a mortgage from Bank-A.

In accordance with some embodiments, Electronic Device 101 is equipped with a camera and/or imager and/or microphone, able to capture or acquire images and/or videos and/or audio. User Adam Smith captures a self image or "selfie" of himself, and the image is uploaded or sent to Remote Server 150, together with the other data-items or information that User Adam filled-in, or shortly before or shortly after such other information (e.g., first name, family name, home address, date of birth, gender, social security number) is sent to Remote Server 150. Optionally, User Adam also provides or uploads copies or images of documents that he has, for example, a photo of his driver's license, a photo of his passport, a photo of his birth certificate, a copy of his government-issued photo ID card, or the like.

The selfie image that is provided by User Adam may be, for example, a static image captured locally by User Adam; or a "live" or "dynamic" selfie that is captured via a lively biometric capturing system or process (e.g., a process that captures a short video of several seconds of User Adam, verifies that the video indicates Liveliness or Liveness of the depicted human, and then selects one particular frame as a representative static selfie image frame). In some embodiments, additionally or alternatively, the image of User Adam may be uploaded or provided to the system by a third-party; for example, by a representative of the Human Resources department of an employer who is currently interviewing User Adam for a job, or by a representative of an admissions department of an academic institution to which User Adam is applying, or by a representative of a bank or financial institution at which User Adam is requesting to open a new account or to obtain a loan or a mortgage; or, in some situations, by a representative of the fraud department or by an identity fraud analyst of one of such entities.

Remote Server 150 receives the uploaded selfie image, and stores it (at least temporarily; and not necessarily for long term) in a storage unit or memory unit. An Image-Based Search Engine 152 performs an image-based search, or a reverse image search; the search input or the search query is the selfie image of User Adam, in its original uploaded form, or in a modified form that Remote Server 150 may prepare (e.g., cropping or discarding background patterns or nearby objects or visual "noise"). The output of the image-based search is a list of Internet-accessible resources (e.g., web-sites; web-pages; online images; online videos; PDF files that are stored online; social media or social network pages or content; or other online content, typically identified or accessed via a URL) that contain one or more images (or videos) that depict, or are estimated to depict, User Adam or a human having a high level of visual similarity to User Adam. For example, the search results may include, the personal page of User Adam on a social network or a social media website (e.g., Facebook, Twitter, Instagram, or the like); a particular page on the website of a particular law firm, titled "Our Attorneys", showing an image of attorney Adam Brown who is an attorney in that law firm and whose photos on that web-page matches the selfie image of user Adam (e.g., matching beyond a pre-defined threshold level of similarity, as determined by a computer vision process and/or by a biometric identification algorithm or a biometric matching algorithm); and so forth.

Additionally, a Text-Based/Keyword-Based Search Engine 153 performs a text-based or keyword-based search. The search query may be or may include, for example, the full name of User Adam, as well as other person-specific information, such as his current home address or his current city or his current zip-code, or his current profession. For example, the search query may be, "Adam Brown Miami" (indicating the city where user Adam lives, based on the information that he submitted), or "Adam Brown attorney" (indicating the profession that user Adam indicated in the form), or "Adam Brown attorney Miami" (indicating both profession and city), or "Adam Brown Walmart Orlando Florida" (indicating also the name and location of an Employer that user Adam has indicated in his submitted form). The search output of the text-based or image-based search is a list of Internet-accessible resources (e.g., web-sites; web-pages; online images; online videos; PDF files that are stored online; social media or social network pages or content; or other online content, typically identified or accessed via a URL) that contain one or more text portions or other online textual elements that mention, or that appear to pertain to, User Adam; for example, a particular web-page of a law firm in Miami titled "Our Team", that has a paragraph about attorney Adam Brown; or a particular page on the website of Walmart.com that mentions that Adam Brown was "employee of the month" in February 2021 in Orlando, Florida; or the like.

The searches are conducted dynamically and on-the-fly, by accessing Internet-based sources in real time, to assess or to estimate the match or the level of matching between (i) the user-provided selfie image and information, and (ii) image and information obtained from such Internet-based sources. Optionally, in some embodiments, the search may be is optimized by storing an index of URLs with possible names of candidate people that may be matched to those URLs. Some embodiments may optionally store or cache or keep copies of the original HTML or code of the actual website or web-page and/or other meta-data. However, in some embodiments, the system need not necessarily keep or store or utilize any persistent storage of any images or biometric representations from Internet-based sources, and the system does not generate or utilize or keep an aggregation of biometric or image databases; in order to respect and to increase user privacy. In some embodiments, optionally, the system may store or keep copies of images that were obtained from Internet-based publicly available sources, such as websites and web-pages, as these are publicly available images that can be obtained by the general public (e.g., by using a search engine or a web crawler or other tools), and are no longer regarded (in some embodiments) as private information that must be heavily guarded or protected.

In some embodiments, an Internet-based source is considered by the system to be a positive match to the selfie and/or information provided by User Adam, if there is both (I) a biometric match between the selfie image provided by the user and an image on the Internet source, and also (II) a name match between the user's name (as provided by User Adam) and a name appearing (e.g., as text) on that same Internet-based source that is plausibly linked to the image. The system thus operates to automatically match between the pair of image-and-name provided by the user, to a pair of image-and-name found on the Internet; optionally utilizing not only a "pair" of two data items (name and image), but also, in some embodiments, using a chain or group or subset of data-items that include at least the user's name, the user's selfie image, and additional data items; for example, such chain or group being the user's name+user's selfie image+user's profession user's geographic location (e.g., "Adam Brown attorney Miami"). In some embodiments, the system may seek and find a match between (i) the selfie image that was uploaded by (or obtained from) the user (who alleges to be User Adam), and (ii) an image or even a non-image information that is part of the personal information of User Adam as included in his application form or as otherwise being part of his request, such as his name, his date of birth, his profession, his gender, or the like. For example, in some embodiments, detecting a match between (i) a fresh selfie image of User Adam, and (ii) a web-page that is titled "images of our attorneys at our law firm's Christmas party of December 2017 in Miami", may be utilized by the system for the purpose of corroborating the identity of User whose request or application indicated that his profession is "attorney" and that he lives and works in Miami, even if his name is not mentioned at all on that particular web-page, if there is detected a visual likelihood of Adam's face in that group photo. The system may similarly search for, and utilize, other suitable types of matches, between (i) selfie image, and/or biometric traits that are extracted from a selfie image, and/or personal information that was submitted by the user or that is already known to Remote Server 150 about the user, and (ii) an image and/or textual information and/or other elements of content that are found on an Internet-based source or website or web-page.

The matching may be performed by a Matching Unit 154, for example, a processor configured to execute code that estimates the relevancy and/or accuracy of each search result, and configured to discard Internet-based sources having a matching score that is lower than a pre-defined threshold value, and configured to keep and utilize one or more Internet-based sources having a matching score that is higher than a pre-defined threshold value. The Matching Unit 154 may thus utilize the "raw" search results or search outputs that the search engines 152-153 had generated, and may generate a Diluted/Updated List of Search Results 155 that maintains the relevant or highly-matching Internet-based sources and that discards the irrelevant or the poorly-matching Internet-based sources.

Then, a Data and Meta-Data Extractor Unit 156 extracts and gathers data or data-items from each of the Internet-based sources that are on the Diluted/Updated List of Search Results 155; as well as meta-data about (or characteristics of) each such data-item obtained from each Internet-based resource. The extraction of such data and/or meta-data may include, for example: (a) utilization of a Natural Language Processing (NLP) Engine 157 to extract entities (e.g., corporate entities, governmental entities), location and geo-location data, time-points, and/or events that are related to the user's name and/or image on the Internet source (e.g., extracting an indication that attorney Adam Brown appears in an "Our Team" page on a website of a law firm having a single office in Miami, Florida; extracting an indication that Adam Brown was "employee of the month" at Walmart of Orlando, Florida in February 2021); (b) utilization of the NLP Engine 157 to extract all dates that are mentioned in that particular Internet source (e.g., that specific page; and not necessarily on the entire website which may include hundreds of pages); (c) utilization of the NLP Engine 157 to extract topics and semantic data about the website content (e.g., determining that the web-page is about "attorneys" or about "law firm"; or about "restaurant", or about "retail store"; or about "high-school classmates"); (d) extraction of keywords, meta-tags, and date of update of the Internet source and/or of specific components therein (e.g., extracting data from the HTML source code of the web-page; extracting an indication or an insight that the image of Adam Brown on Walmart.com has an image filename of "Employees_2021-02-27.jpg").

The system also extracts or generates (e.g., using a Computer Vision Unit 158) meta-data that pertains to each matched image that was obtained from the Internet source; for example: geo-location data, time and date data or time-stamp/date-stamp data, file name (e.g., "Adam-February-2021.png"), source file path (e.g., "law-firm.com\our-attorneys\adam-brown"), camera and/or electronic device meta-data that may be embedded in the image itself and/or in the image file header (e.g., some smartphones encode device data as part of the file-name, such as Google Pixel phones generating images having a file-name that begins with "PXL"; some smartphones or cameras embed EXIF location image into photos; the date and time in which an image was captured is often a part of the file-name of the image on many smartphones or cameras).

The system may also extract or deduce or generate one or more inferred properties or inferred characteristics, that pertain to the person(s) in the image being analyzed, using the Computer Vision Unit 158 and optionally utilizing an Machine Learning (ML)/Deep Learning (DL) engine; for example, inferring from visual details the person's gender, age or age-range, race, nationality, hair color, eye color, clothing articles or clothing style, accessories worn (e.g., glasses, sunglasses, earrings), tattoos or body art or piercings, religious artifacts or indications (e.g., a religious head cover; a necklace with a religious artifact). Some embodiments may further infer or deduce or estimate other data, for example, the number of people that are depicted in the image; the inferred geolocation of the image using machine learning or deep learning or computer vision (e.g., the image of User Adam on his Facebook page shows him standing next to the Statue of Liberty in the background, thereby inferring geo-location of New York City or its vicinity); inferred time and/or data of the image using machine learning or deep learning or computer vision (e.g., the image of User Adam on his Facebook page shows him holding the New York Times newspaper with a clear front-page cover of Mar. 16, 2019, indicating that the image was taken on or after that date but not before that date; or, the image of user Adam depicts him wearing a shirt saying "Biden Harris 2020", indicating that the image was taken in 2020 or later but not in 2019 or earlier; or, the image of user Adam depicts him holding an iPhone, thereby indicating that the image was taken in June 2007 or later, but not prior to June 2007; and so forth); the resolution and color properties of the image; indications of "date updated" and/or "date modified" and/or "date created" with regard to each image or data-item or file (e.g., such meta-data of a PDF file, if the image of Adam is extracted from a PDF file that is stored and available online and contains the image being analyzed); or the like.

Internet-Based Source Data Collector Unit 159 operates to collect or obtain or deduce insights or data with regard to the image obtained from the Internet-based source, and with regard to the Internet-based source itself; for example, estimated traffic (e.g., number of unique visitors per day or per months; number of page-views per day or per month) to the Internet-based source, using third-party ranking sources (e.g., Alexa ranking score) and/or third-party clickstream data and/or using one or more sources that rank websites based on popularity and/or traffic; WhoIs domain information, including the date that the domain was registered, and the names of persons or companies listed in the WhoIs information; whether the website has been placed on any publicly recognized blacklists, or lists of malicious activity; Internet Service Provider (ISP) information, hosting information; history of edits to the Internet source page, for example, based on data which may be part of the web-page itself (e.g., "last updated on date X"), or which may be part of the website (e.g., similar to Wikipedia pages which may be viewed in their past versions), or which may be obtained from Internet archiving repositories (e.g., from Archive.org); the deduced type of website that the Internet source is (e.g., social media; governmental; news site; personal blog; company blog; company website; personal website; an information aggregation website; or the like); Top-Level Domain, domain suffix, domain prefix (e.g., the domain name ends with ".gov", indicating a governmental website; the domain ends with ".edu", indicating an educational institution; the domain ends with ".com", indicating a commercial or personal website; the URL starting with "mobile.", indicating that this is a mobile-friendly version of a website; the URL starting with "Adam-Brown.Social-Network.com", or ending with "Social-Network.com/User-Pages/Adam-Brown", indicating a personal page of user Adam on a Social Network website; or the like).

In some embodiments, the image appears on a web-page that is part of Domain A (for example, the HTML page is served from a server of Domain A); but the image itself, which is shown within that web-page, is served by or hosted at Domain B; and in such situation, the system may collect the above data and meta-data with regard to each one of those Domains, and with regard to each one of the relevant URLs (e.g., the URL of the HTML page of the web-page; and the URL or URI of the JPG file of the image).

The system proceeds to analyze the data collected and/or generated above; and to generate multiple Scores, as well as a weighted aggregate score. The multiple scores may be, for example, a Reliability Score, a Uniqueness Score, an Activity Score, a Correlation Score, and a History Score; and the combined or aggregated or weighted score may be a R-U-A-C-H score or a RUACH score or a Combined Weighted Score. For demonstrative purposes, some portions of the discussion herein may relate to such score(s) being generated and demonstrated on a particular scale or spectrum, such as on a scale of 0 to 10; however, these are only non-limiting examples, and some embodiments may utilize other scales or ranges-of values (e.g., 0 to 100, or 0 to 500); and/or may utilize a range of discrete values (e.g., 0 or 1 or 2 or 3 or 4 or 5, but not 2.7); or may utilize a scoring system that translates or coverts a numerical component to an indicator or a flag which may have one of exactly two values (e.g., True or False), or which may have one of exactly three values (e.g., Low, Medium, High), or which may have one of exactly N values (wherein N is a pre-defined positive integer).

For example, a Reliability Score Determination Unit 161 may generate a Reliability Score, indicating the overall trustworthiness of the Internet-based source. For example, a social media source would have a reduced weight or a reduced reliability, since virtually anyone is able to create a social media profile and page, and to write or post or modify its content, and to thus manipulate the name, image, and other information that are obtained from a social media profile or from a social media page or post. Accordingly, an image tagged with "Adam Brown", appearing on a personal Facebook page (of Adam Brown, or of a person alleging to be Adam Brown, or of a person alleging to know Adam Brown) has a low reliability, since such information can be easily produced online by anyone without necessarily being true or correct; and the image of Adam Brown appearing on a Facebook page may thus have a reliability score of 1, on a scale of 0 to 10. Conversely, a government website would have higher reliability score, since it can be edited only by a limited set of generally trustworthy people; therefore, the image of Adam Brown on the website of the Department of Justice, in a page titled "Our District Attorneys", will have a reliability score of 9 on that scale. Similarly, the image of Adam Brown, found on the web-page of the legal department of Microsoft Corporation, will have a reliability score of 8 on that scale; it is not a governmental website, but only few people in that organization are authorized to write or modify that page. Similarly, the image of Adam Brown, found on the web-page of "About Us" on the website of "My-Best-Restaurant.com", may be assigned a reliability score of 3 on that page, as it is relatively easy for anyone to purchase such domain and to build such a website. In another example, an Internet source that receives a substantial amount of traffic, such as a highly viewed Wikipedia article, may be assigned a higher reliability score, relative to a low-traffic website, or even relative to a low-traffic, obscure, Wikipedia page.

A Uniqueness Score Determination Unit 162 generates a uniqueness score, which indicates the likelihood of an accurate facial biometric match between (i) the selfie of the user as submitted, and (ii) the matched image on the Internet source. This may be, for example, a function of the biometric Machine Learning/Deep Learning algorithms. For example, if there is a near perfect match between the selfie image and the matched image, then the uniqueness score would be high, such as 9 on a scale of 0 to 10. However, if the biometric matching level is not strong, and there remains a substantial possibility that the matched image is actually of a different person, then the uniqueness score for that image would be lower, such as 3 on that scale.

An Activity Score Determination Unit 163 generates an activity score, which indicates the extent to which an Internet source (or match) is a static (or non-changing, or little changing, or rarely changing) source, or a more dynamic, continually updated, or frequently updated, web-page or profile. This may take into account, for example, content on the Internet source as well as the history and changes and modifications of that content over time. For example, if an Internet match is found on an educational website with continually updated content and on-page user discussions, then it would have a high activity score, such as 9 on a scale of 0 to 10. Conversely, is the Internet match appears in an old industry conference website that is static and is no longer updated or modified, then a low activity score may be assigned, such as 3 on a scale of 0 to 10.

A Correlation Score Determination Unit 164 generates a correlation score, which indicates the level of correlation between (i) the selfie about the user, and/or the information about the user, as provided by the user himself (or by a third party utilizing the system to authenticate the user's identity), and (ii) the information about the user as obtained and/or extracted and/or inferred and/or deduced from the Internet source and/or from the matched image. For example, user Adam Brown has provided his current home address as New York City. If the matched image has geo-location meta-data (e.g., EXIF data) that indicates that the photo was indeed taken in New York City, then such insight may yield a higher correlation score, such as 8 on a scale of 0 to 10. Conversely, if the user declares to be a male, yet the Computer Vision/ML unit(s) infer that the person depicted in the photo is female (e.g., based on recognition of body parts, hair, skirt, accessories, or other indications), then the correlation score would be lower, such as 1 on a scale of 0 to 10.

A History Score Determination Unit 165 generates a history score, indicating the length of time (e.g., in days) that the matched source (website, web-page) and the particular matched image have been accessible on the Internet. This score may also take into account any changes or modifications that have been made to the source and/or the particular image. For example, if an image was only posted to the Internet five days ago, this would result in a low history score (e.g., 1 on a scale of 0 to 10) reflecting a concern that a fraudster or attacker may have freshly and recently posted the image in order to defraud the system. Conversely, if a source and/or image have been accessible for seven years without any changes, then the history score would be higher, such as 8 on a scale of 0 to 10. As another example, if Image-A was posted five days ago, but replaced a previous image, Image-B, that had been served on that web-page for the previous four years, and that previous image (Image-B) also matches the selfie biometrics of the claimed user, then Image-B may be assigned a high history score; and Image-A, if it is visually similar or equivalent to Image-B, may also be assigned a high history score. In other embodiments, a replaced image may be assigned a high history score, whereas the replacement image (the fresh image, the later image) is not assigned a high history score.

Then, a Combined Weighted Score Determination Unit 166 receives as input the five above-mentioned scores (Reliability score, Uniqueness score, Activity score, Correlation score, History score); applies a pre-defined weighting formula, or a dynamically-selected weighting formula; and generates a Combined Weighted Score that indicates or quantifies, numerically, the overall quality (or utility, or efficiency, or suitability, or usefulness) of the matched image for purposes of proving or supporting or verifying the user's identity. In some embodiments, the weighting formula may be pre-defined; or it may be dynamically selected or dynamically configured (e.g., dynamically modifying or configuring the weighting coefficient) based on one or more pre-defined dynamic configuration rules; for example, depending on the goal or the objective of the verification (e.g., open a new bank account; apply for a job; apply for admission to educational institution; apply for mortgage; apply for insurance), and/or depending on the amount of transaction involved, and/or depending on data or meta-data of the image(s) that were analyzed (e.g., increase the weight of the Reliability Score if at least N sources are from ".gov" websites; reduce the weight of the Reliability Score if at least M sources are from social networks).

Some embodiments may further include and utilize a Diversity/Variety Score Determination Unit 167, which may analyze the collected and/or generated data (and/or scores) and may generate a Diversity/Variety Score; which indicates the diversity of images that were matched for a particular user across all the matched Internet-based sources. The Applicants have realized that, for example, a particular image of a user, such as a formal-looking portrait image that was taken by a studio photographer, is often "carried" by a user across multiple jobs or entities or websites during his life or career; or variants or modified versions of such image (e.g., enlarged, reduced size, cropped, mirrored) may similarly "follow" the user across multiple Internet-based sources, or may be duplicated from a first Internet-based source to other Internet-based source (sometimes without the user's request or consent or control; for example, a website that aggregates data and images of physicians, by collecting such data and images from personal websites of physician offices or clinics). In some embodiments, a greater diversity of images may be associated with a rule that increases believability and trustworthiness, and may provide the system with a richer set of information from which to corroborate a person's identity. The system may optionally utilize Machine Learning/Deep Learning (ML/DL) algorithms to estimate or assess or determine the diversity of the set of matched images for a particular user, constrained to the fact that all such matched images should still contain therein (or enable) a biometric match to the person's original selfie image as uploaded to the system. In other embodiments, one or more pre-defined rules may be utilized to handle or estimate image diversity in other ways; for example, a repeated utilization of the same image, across several different ".gov" websites or web-pages, does not necessarily indicate reduced believability; but rather, may conversely indicate, in some situations, that this particular repeated image is highly trustworthy in view of its repeated utilization across multiple governmental websites (e.g., a government official who has several positions in parallel, and/or who advanced or transitioned every few months from one governmental position to another).

Some embodiments may further include and utilize a Consistency Score Determination Unit 168, which may analyze the collected and/or generated data (and/or scores) and may generate a Consistency Score; which indicates the level of consistency (and particularly, internal consistency) among images that were matched for a particular user across all the matched Internet-based sources. In a first example, all the matched images and information of User Adam indicate proximity or relation to New York City; for example, indicated as his current home address, indicated as his current employment venue, appearing visually in images on the user's Facebook page, appearing visually in images on the user's "about our team" page on the website of his employer, matching the EXIF data in images that depict him, matching the address of the office of the current employer, or the like; thereby contributing to a high Consistency Score, which is translated by the system as an indicator for trustworthiness. In contrast, in a second example, the Consistency Score pertaining to User Carla may be low, since she indicated a current address in New York City; whereas EXIF data of images on her Facebook page often show her, regularly, performing daily operations in Miami; and whereas contextual analysis of her online social media posts actually points to her living in Texas; and so forth.

Some embodiments may include and utilize a Trustworthiness/Suspiciousness Indicators Detector Unit 169, which may extract from the collected and analyzed data one or more additional indicators of trustworthiness—or conversely of suspiciousness—with regard to the identity of the user that is being evaluated based on (or by taking into account) the submitted selfie image thereof. One or more individual data points or indicators may be extracted or detected or identified, and utilized, and optionally also aggregated or correlated or cross-correlated. Such additional indicators or data may include, for example, particular or aggregate statistics about the Internet-based sources, such as the total number of Internet matches, the total number of Internet matched images, the total number of Internet matched pages, the aggregate popularity (or ranking, or visitors traffic) of the matched Internet sources, the total number of "blacklist" matches, the total number of government website matches, the total number of social media pages or posts that were matched, the total number of information aggregation website matches, the earliest time-stamp for a matched image that was found on the Internet. The indicators, or the aggregated data, may further include aggregated inferred properties of the person(s) in the image that were extracted using Machine Learning or Deep Learning of Computer Vision, as described above.

Based on some or all of the scores, parameters, insights, determinations and/or indicators that were extracted and/or generated as described above, and optionally by utilizing a pre-defined or a dynamically-selected weighting formula, an Overall Identity Match Probability Determination Unit 170 generates an Overall Identity Match Probability Score, indicating the estimated probability that the user-submitted selfie image indeed depicts the user whose information was submitted to the Remote Server 150, based on one or more Internet-based resources and particularly Internet-based images and data and meta-data. The overall score may also indicate, in some embodiments, the overall probability of identity verification of the user, or of authenticating the identity of the user who submitted the form or the data, or the overall probability that the person under consideration is indeed identified correctly. In some embodiments, the overall probability score may be generated by taking into account weighting guidelines or weighting rules or weighting coefficients that are provided by a particular entity or client (e.g., a bank, an insurance company, an employer, an academic institution) and/or by taking into account one or more goals of the verification process (e.g., identifying the user for the purpose of opening a bank account, or requesting a credit card, or requesting employment, or requesting admission to academic institution, or requesting a mortgage or a loan or requesting an insurance policy, or the like). For example, a first goal or a first client of the system may define a high or strict threshold for identity verification, and it may be specifically concerned about having highly accurate biometric matches; and accordingly, the system may heavily weight the Uniqueness Score, and/or may further impose or apply greater penalties on low scores of individual Internet-based sources. The overall probability score may be, for example, a number in the range of 0 to 100, or other suitable range.

The Overall Identity Match Probability Score may be used by system 100, such as by Remote Server 150, for one or more purposes or as part of one or more processes. For example, a Petition Decision Generator Unit 171 may generate a decision (e.g., accepted or rejected) on a petition or an application or a request that was submitted by the user (e.g., petition or application to open a new bank account, or to obtain a mortgage or loan or insurance or credit card, or the like), by taking into account the Overall Identity Match Probability Score. Optionally, other types of decisions may be generated, instead of or in addition to acceptance/rejection; for example, a decision to require the user to submit additional proofs of identity, or to perform one or more tasks (e.g., a requirement to call telephonically a customer service representative or a fraud department for further investigation or identification; a requirement to physically visit in-person a branch or an office). In some embodiments, if the Overall Identity Match Probability Score is smaller than a pre-defined threshold value, then the a Fraud Mitigation Unit 172 may be automatically triggered or deployed, to perform or to initiate or to activate one or more pre-defined fraud mitigation operations; for example, generating a notification to one or more recipients that a fraudulent petition was received, generating an alert message to one or more human reviewers, placing the user's petition or request on hold or in quarantine or routing it to analysis by a fraud department or by an expert team, blocking or freezing the access of the user to one or more online services and/or accounts and/or features, closing an existing account of the user, generating and sending to the user one or more requirements to perform particular tasks (e.g., to provide additional identifying documents or instruments; to contact telephonically or in-person a representative), selectively blocking or limiting a particular type of transactions for that user (e.g., wire transfer, but not balance inquiries), or the like.

Some embodiments may be used to achieve a variety of goals, for example: (a) Identity Proofing or identity re-proofing, or identity proving or identity re-proving; the system is used as a standalone system or as for such identity proofing, or in conjunction with or in addition to other identity verification methods (e.g., document-based identification, driver's license, passport). (b) Know Your Customer (KYC) or Know Your Client (KYC) or Anti Money Laundering (AML) systems, as a standalone system or as an additional KYC/AML technique; (c) Device Binding, to enable binding of an electronic device to a particular user identity, as a standalone binding solution or in conjunction with other techniques; (d) Identity Investigation, such as by an analyst or a fraud investigator who may utilize the system to perform an identity investigation regarding a particular user by utilizing the results of the online matching process.

Some embodiments may provide a biometric identity proofing and re-proofing system that protects privacy and security by removing all (or most of, or a significant portion of) biometric information upon storage. The system may utilize inputs provided by the end-user of the electronic device; and/or inputs provided by the organization or entity that is considering to fulfill a request of such end-user; and/or inputs provided by third parties, such as a fraud investigator or analyst.

For example, the inputs that are received or obtained by a Biometric Inputs Reception Unit 120 may comprise: (a) the user's name (e.g., first name, family name) and/or other Personally Identifiable Information (PII) (e.g., date of birth, current city of residence); wherein such inputs need not necessarily enable uniquely identifying of the user (e.g., there may exist several persons named John Smith, all of them born on the same date, all of them living in New York City); (b) an image of the user, such as a selfie image or a selfie video (or a frame extracted from such selfie video), or an image of that user as captured by a third party on his behalf, or other biometric representation of biometric trait of the user (e.g., retina scan; fingerprint scan; voice sample). Some embodiments may receive or obtain additional inputs; for example, if the image was obtained from a particular Internet-based source, then a URL or URI of the source, as well as image meta-data, may also be obtained and/or used as inputs.

Optionally, in some embodiments, the inputs or some of them may be converted into a normalized format or a uniform format, particularly if such inputs are received or obtained from different sources (e.g., all images are converted to JPG; all birth-dates are converted to format of YYYY-MM-DD; or the like). Optionally, the inputs are concatenated in accordance with a particular order, and with flags or particular strings or dividers indicating each field in the single unified record.

Then, a Cryptographic Hashing Unit 121 performs one-way hashing of the inputs (or, of a concatenation of the inputs, or of a joined version that accumulates the inputs or their normalized versions). For example, an Inputs Aggregator/Concatenator Unit 122 operates to aggregate together the various inputs, such as the name of the user, the other PII about the user, and the selfie image (or other biometric identifier or trait) of the user, into a single unified record or a single combined record or a single aggregated record; such as, by summing up together the ASCII values of the textual components of the PII elements, and also summing up the RGB values of each pixel in the image, and then summing up the two sums; and the aggregated record is then fed into a one-way cryptographic hashing function (for example, MD5, or SHA-1, or SHA-2, or SHA-3, or the like), which generated a Hashed Irreversible Tokenized Data-Item 123 that corresponds to the aggregation of the PII data and the selfie image (or other biometric input that was provided).

The hashing and tokenization process thus generates a unique and irreversible digital token that represents a combination of (a) some PII of the user and (b) an image of the user and (c) optionally also other information that was provided or obtained as input. This token is completely private and anonymized of all PII, image information, and biometric information.

In some embodiments, optionally, the image or the biometric input may be partially processed prior to being passed through the one-way hash function. For example, in the case of an image, the system may detect or determine which quadrant (or other partial portion or region) of the image contains the majority of the user's face; and only the content of that particular quadrant (or region, or area, or polygon) may then be passed with the PII data into the one-way hashing function. Similarly, in the case of an image, the system may identify the precise location or the estimated location of the user's face; and only the specific area of the user's face may be passed with the PII data into the one-way hashing function. Such approach may help to ensure that the image (or other biometric input) is more specific to the user, and reflects mostly the user rather than "background noise" or background details or ambient details which do not contribute to user identification. Similarly, in the case of a biometric input, only the first N percent (e.g., only the first 30 or 40 or 50 percent) of the biometric data may be utilized and may pass through the hash function; to also compress or reduce the amount of data that is passed through the hash function, to speed-up the processing, and to further contribute to preserving user privacy. In some embodiments, additional information about the image and/or the biometric input may also be passed through the hash function; for example, the coordinates of the center of the user's face in the image may be passed into the hash function as additional input.

In some embodiments, provenance information about the image and/or the biometric input, indicating the source or the custody chain in that item, may also be passed through the hash function. For example, if the image was obtained from an Internet-based source, either the URL of the source image and/or the URL of the website on which the image appeared may be passed through the hash function as additional parts of the hashed inputs. If the image was provided by a user from their electronic device, then the device ID or a particular data-item of the device (e.g., device model, device maker, device MAC address, or the like) may be passed as well through the hash function. If the image was provided from a user's cloud storage system, then an identifier of that user's cloud storage account may be passed as well through the hash function.

The generated Hashed, Irreversible, Tokenized Data-Item 123 may be stored in a Digital Tokens Repository 125. The Hashed, Irreversible, Tokenized Data-Item 123 has already anonymized all PII and biometric information of the user; and therefore, in some embodiments, the security and/or privacy requirements for storing the token may be less severe relative to those that are utilized for storing PII and/or biometric information. The Hashed, Irreversible, Tokenized Data-Item 123 may be stored, for example, in a database or a data-set, in a repository, in a peer-to-peer database or system, in a distributed storage system, in a centralized storage system in a decentralized storage system, in a blockchain or as part of a blockchain, and/or in other storage means.

Optionally, the system may also store meta-data information linked to the Token itself or associated with the Token. For example, in the case where the token is created during an identity verification event (e.g., identifying a customer for a bank, or identifying a user for processing a request to provide a digital service) then information about the identity verification process may be stored alongside the token itself (e.g., whether the verification was successful; whether the verification yielded an acceptance or a rejection; the level of confidence of the evaluating entity in the verification result; what measures were taken to identity the user; when the verification occurred). Similarly, in the case where the token is created during a KYC/AML event on inquiry (e.g., when a new customer signs up for a bank account), then information about the KYC/AML event or inquiry may be stored alongside the token itself (e.g., whether the KYC/AML event was successful; whether the KYC/AML event yielded an acceptance or a rejection; the level of confidence of the evaluating entity in the KYC/AML event result; what measures were taken to identity the user for the KYC/AML event; when the KYC/AML event occurred; which particular measures or instruments were utilized in the KYC/AML event; which third-party KYC/AML measures or inputs were used). In some embodiments, in the above example, none of the linked information needs to contain any PII of the user and/or any biometric information of the user.

Subsequently, the stored token may be utilized by the system for re-verifying the user or for re-proving user identity; such as, by a Re-Verification Unit 131 or by Re-Proving User Identity Unit 132 which may utilize such token to hasten or speed-up their operational processes, and/or to reduce the burden on the user in providing additional identity-proving instruments.

For example, in a subsequent session usage (and/or in some or all subsequent usage sessions), the system may receive another set of inputs that allegedly pertain to the same user. These inputs include the user's name and/or other PII, as well as the image of the user (or the other biometric representation of the user), and optionally other information such as the provenance information (regarding the user's PII and/or image and/or other biometric input).

The system then repeats the one-way hashing and tokenization process with these new inputs or freshly-submitted inputs, and generates a fresh digital token. This fresh digital may be compared to one or more previous digital tokens that were previously generated for that user and were stored in the Digital Tokens Repository 125. If the fresh token perfectly matches the originally-stored token or the "reference" token or the "historic" token, then the system determines that the user operating the current (the fresh) usage session is the same user as the user who operated in the original or historic or initial usage session. The identification may be computed by directly comparing between the two hashed digital tokens, without comparing any biometric data of the user and/or without comparing any PII information about the user or of the user. In some embodiments, this may be achieved and is operational even without knowing any biometrics or PII from the original usage session, as those data-items have already been hashed and tokenized and need not be stored or retrieved or compared. If additional information, such as the image provenance information, was included in the one-way hashing process, then a match between the two tokens also confirms that the fresh image (or biometric input) and the original one were sourced from the same location or source.

In some embodiments, if the freshly generated token indeed matches a previous token, then the meta-data that is linked to the previous token may be updated with additional, fresh, meta-data. For example, if this new session is an identity verification event or a KYC/AML event, then information about this new event (e.g., as described above) may be added to the meta-data record that accompanies the original token and/or that is linked to (or associated with) the original token. In some embodiments, optionally, a Token Matches Counter/Tracker 133 may be used to track and/or count how many times the original token was compared to a freshly-generated token, and to further monitor and log the result of each matching or comparison process and the time and date of each matching or comparison process; and such tracking and counting mechanism may be incremented or updated accordingly.

Some embodiments may monitor, track, and utilize historical verification (and re-verification) information and reputation information, based on the generation subsequent comparisons of tokens. For example, a freshly generated token matches a previously generated token; the older token has additional verification information associated with it (e.g., meta-data from an identity verification event or a KYC/AML event). All previous meta-data that was already associated with the older token, may (in some embodiments) be replicated to (or duplicated to, or inherited by) the freshly-generated token and may be attributed to the new usage session, thereby verifying the user's identity and further verifying other events (e.g., ensuring that KYC/AML requirements are met, based on the previous KYC/AML meta-data). Similarly, if other metadata, such as various reputational data, is associated with the previous token, such additional meta-data be applied to (or inherited by, or duplicated towards) the current usage session or that user. The term "usage session" may optionally include a goal or an objective or a transaction that is requested by the user; such that, for example, a user who had already verified his identity and caused generation of an original token for the original purpose of opening a new bank account, may later enjoy a shorter or faster re-verification process when that same user is now requesting to obtain a loan, or an insurance, or even an entirely different service or benefit (e.g., applying for a job, applying to an academic institution).

In some embodiments, the Re-Verification Unit 131 and/or the Re-Proving User Identity Unit 132 may take into account one or more attributes or characteristics or metadata of (or related to) a past verification of user identity or a past tokenization of user identity, and/or may assign a different weight to such past verification or past tokenization based on one or more attributes. For example, the Re-Verification Unit 131 and/or the Re-Proving User Identity Unit 132 may assign a greater weight to a past verification that is fresh (e.g., one month old), and may assign a lower weight to a past verification that is old (e.g., four years old); or may assign a greater weight to younger or fresher past verification, while assigning a smaller weight to older or stale past verifications. In another example, the type or source of a past verification may also be taken into account by the Re-Verification Unit 131 and/or the Re-Proving User Identity Unit 132; for example, assigning a higher weight to a past verification that was performed by a national bank having thousands of branches nationwide or worldwide, or assigning a lower weight to a past verification that was performed by a small local bank having three branches nationwide. Other attributes of such past verification or tokenization may be used, for weighting purposes by the Re-Verification Unit 131 and/or the Re-Proving User Identity Unit 132; and may even result in a complete discarding of a past verification that is determined to be stale (e.g., eight years old) and less reliable (e.g., was performed by a small local entity that had already gone out of business).

The system may be utilized to achieve a variety of goals; for example: (a) Re-Proofing or Re-Proving user identity, Re-Binding a user to an electronic device or to a computerized service or to a computerized server, Re-performing a KYC/AML verification process, by performing re-verification based on private and anonymized tokens to re-identify any user who have been previously analyzed and whose identity was already digitally tokenized through the system (even if this was done by, or for, another entity; such as by another bank or another insurer; or for the purpose of a different type of transaction or requested service). (b) Cross-Organization Verification of a user, such that multiple different and separate organizations may use the system to share verification information about a user without sharing among them (or without storing long-term) any PII and/or any biometric information about the user, and without sharing any internal company data.

Some embodiments may provide an innovative identity verification technology that allows entities to efficiently accept or onboard customers. The Applicants have realized that entities (such as banks or insurers) are rejecting potential customers and are rejecting new customer applications, on a daily basis. For example, a user attempts to open a new bank account, using a mobile "app" of Bank-A that the user installed on his smartphone The user provides some basic information, such as his first name, family name, date of birth. The user then provides or uploads images of one or more documents to verify his identity (e.g., a driver license, a passport); and is also requested to capture and upload a selfie image (or selfie video) of himself, as part of a remote onboarding process. The Applicants have realized that in many situations, the application of the new user is rapidly rejected, and a new customer opportunity is lost, since the selfie image his hastily compared by the remote server of Bank-A to the image that appears in the uploaded driver's license or passport, which often fail to match for various reasons (e.g., the image in the passport was taken 9 years prior to the fresh selfie image, and the depicted person has changed from age 20 to age 29). Some users may be requested to provide an alternate photo-ID card, such as a student card; but not all users have such a card, and often it does not solve that problem. Some users are requested to contact the bank telephonically, or to arrive physically to the branch in-person, and these processes are cumbersome and time-consuming, both for the user and for the bank, and defeat the purposes of rapid and efficient online onboarding and friction-less onboarding. The Applicants have realized that due to the above, many suitable candidates or applicants are rejected or blocked or turned down, and a large number of opportunities are lost for both the rejecting bank and the rejected potential customers.

The Applicants have realized that photo-ID based verification is imperfect, and results in loss of new customers. Additionally, realized the Applicants, there are many potential customers who do not have a photo-ID, or a valid photo-ID, or a photo-ID showing a fresh photo of their current face, or that have lost or misplaced their photo-ID, or that are not capable of imaging their photo-ID or uploading it. The Applicants have also realized that there are fraudsters and malicious actors and identity thieves, which the bank cannot ignore, and which purchase or produce fake or fraudulent photo-ID cards (or, their digital representations), and such attackers may be able to defeat even sophisticated forms of conventional photo-ID based verification.

Some embodiments thus provide a new verification system, to help organizations to reduce the number of incorrect rejections of otherwise good candidates to become new customers. In some embodiments, once a customer provides some basic information and a selfie image, the system is not limited to comparing that fresh selfie image to the image in a nine year old passport or driver license; but rather, the system compares the fresh selfie image against the customer's public online identity or his public online presence or his public online footprint. This public online identity of the user is comprised of information, text, images, videos, meta-data, and other elements which may be obtained or extracted from public sources or Internet-based sources, such as, the website of a company that employs the customer, a web-page about a conference that that customer has attended a few years ago, an online newspaper article or news article that mentioned the customer in some context, or the like. The Applicants have realized that many users have a public online presence or a visual persona, which is accessible to the system and from which information can be extracted. The system utilizes the information obtained from such online persona to corroborate or verify (or conversely, to negate) a person's identity. This allows the system to accept customers even if there are issues in the automatic photo-ID analysis, or even if the user or candidate does not have a physical photo-ID. The system performs a dynamic search and evaluation on-the-fly. The system does not store any personal information of the user, thereby ensuring full privacy for the user and also compliance for the entity or organization involved. The system may also obtain the user's consent to search the Internet for data about the user, and for collecting and analyzing such data. The system operates without storing or keeping long-term any images and/or biometric inputs of the customer; such input data is utilized rapidly (e.g., within a few seconds or minutes) and is then discarded without storing it. Furthermore, unlike a law enforcement agency, the system does not attempt to identify who the customer is, but rather, the system determines whether the customer is who he says that he is. In some embodiments, optionally, the system may store URL or pointers to the source(s) of images or information that were found online, as these are publicly-available sources, and they can be dynamically linked. In some embodiments, optionally, the system may (in some situations) keep a local copy of images that were found online, as this may be required in certain scenarios to maintain a "paper trail" that explains why or how a particular customer was verified (e.g., to meet possible requirements of KYC/AML regulations).

The system collects publicly-available data about the customer, and analyzes such data. For example, the system finds the user's photo appears on a page of a ".gov" website, where the user works or worked; and the match quality and uniqueness and reliability of such find are high. A reliability score may also be increased as images are collected from several different online sources, that are independent and separate of each other. The entire set of matched images and matched data is also analyzed as a whole, to generate additional insights. A history score may be used to indicate whether the online presence of the user exists for a long time (e.g., at least N years) or for a short times (e.g., less than a week). In some embodiments, the system may also generate a map, or a map-like representations, indicating the geo-locations that are associated with each image that was obtained; as part of the check whether the geographical region of such images matches a declared geographical region (e.g., as declared by the customer in his application form). The collected information may be aggregated and then used as a digital token, particularly as a result of a one-way hashing process which masks the original data and preserves user privacy.

In a demonstrative example, an attacker attempts to imitate the legitimate user (Adam Brown, in the above example), and manages to produce a "fake ID card" via a photo editing program. However, the rest of the details and history of the attacker are synthetic; the attacker has a fake ID card, but does not have and cannot fake the historical trail of the online persona or the online appearance of the real user (Adam Brown). The attacker faces significant hurdles in his attempt to fake the online presence of the real user; since the real online presence is often associated with time-stamps that go years back and cannot be easily forged or faked or replaced. Accordingly, the system of some embodiments may indeed find such freshly-forged or freshly-faked online presence items that an attacker has recently created by meticulous efforts; but the system would detect that they are all fresh and/or that they are located at public online venues that can be easily forged or created, and not on official organizational or governmental websites; thereby determining a low Reliability score, and also a low History score, as well as a low overall Trustworthiness score.

Some embodiments may even enable a customer, who does not have a photo-ID, at all or currently, or is unable or concerned to upload it, to still apply to a new service and get accepted, based on data extracted from his online appearance and from his online footprints in the past decade. Alternatively, the system may be utilized in conjunction with a requirement to upload a photo-ID, as a means to improve the level of confidence in the resulting outcome of verifying the user. Accordingly, the system provides a new identity verification tool that is: completely private, does not change the flow of operations performed by the user, reduces the burden and friction to the user, and can even verify a new customer without relying on a photo-ID card thereof.

In some embodiments, a system comprises a Tokenization Unit, that is configured: to receive from a user a user-submitted biometric data-item of said user; to receive from said user one or more user-submitted data-items of Personally Identifiable Information (PII); to generate an aggregated data-item that comprises (i) at least a portion of the user-submitted biometric data-item and (ii) at least a portion of the one or more user-submitted data-items of Personally Identifiable Information (PII); and to perform irreversible one-way cryptographic hashing of said aggregated data-item into an irreversible tokenized data-item that enables user authentication based on biometric data and PII data.

In some embodiments, the user-submitted biometric data-item comprises at least one of: a selfie image, a selfie video, a fingerprint, a voice sample, a retina scan, a face image.

In some embodiments, the aggregated data-item comprises: (i) only a portion of, and not an entirety of, the user-submitted biometric data-item; and (ii) only a portion of, and not an entirety of, the one or more user-submitted data-items of Personally Identifiable Information (PII).

In some embodiments, the aggregated data-item further comprises a meta-data item that describes a property of said user-submitted biometric data-item.

In some embodiments, the aggregated data-item further comprises a meta-data item that describes a property of an electronic device that was used for providing said user-submitted biometric data-item.

In some embodiments, the system comprises: a re-verification unit, that is configured: to receive a fresh biometric data-item and a fresh PII data-item that allegedly belong to said user; and to generate from said fresh biometric data-item and said fresh PII data-item a fresh tokenized data-item which is compared against said irreversible tokenized data-item to authenticate said user or a current usage session of said user.

In some embodiments, prior to the irreversible one-way cryptographic hashing, the user-submitted biometric data-item of said user is compared by a Matching Unit to one or more data-items that are obtained from an Internet Source based on said user-submitted biometric data-item and/or based on said Personally Identifiable Information (PII) data-item.

In some embodiments, the Matching Unit comprises a Reliability Score Determination Unit, configured to generate a Reliability Score indicating an overall trustworthiness of the Internet Source from which said one or more data-items are obtained.

In some embodiments, the Matching Unit comprises a Uniqueness Score Determination Unit, configured to generate a Uniqueness Score that indicates a likelihood of an accurate biometric match between (i) the user-submitted biometric data-items and (ii) a matching biometric data-item obtained from said Internet Source.

In some embodiments, the Matching Unit comprises an Activity Score Determination Unit, configured to generate an Activity Score that indicates a level of change-over-time of content of said Internet Source.

In some embodiments, the Matching Unit comprises: a Correlation Score Determination Unit, configured to generate a Correlation Score that indicates a level of correlation between: (i) the user-submitted biometric data-item, and (ii) information about said user as extracted from said Internet Source.

In some embodiments, the Matching Unit comprises: a Correlation Score Determination Unit, configured to generate a Correlation Score that indicates a level of correlation between: (i) the user-submitted Personally Identifiable Information (PII), and (ii) information about said user as extracted from said Internet Source.

In some embodiments, the Matching Unit comprises: a History Score Determination Unit, configured to generate a History Score indicating a length of time that information, which was obtained from said Internet Source and appears to be matching said user, has been accessible on the Internet.

In some embodiments, the Matching Unit comprises: a Combined Weighted Score Determination unit, configured to generate a Combined Weighted Score based on (i) said Reliability Score and (ii) said Uniqueness Score and (iii) said Activity Score and (iv) said Correlation Score and (v) said History Score.

In some embodiments, the Combined Weighted Score Determination unit further takes into account a Diversity and Variety Score, which indicates a diversity of types of Internet Sources from which data-items about said user were obtained.

In some embodiments, the Combined Weighted Score Determination unit further takes into account a Consistency Score, which indicates a level of internal consistency in content of two or more data-items that were obtained from Internet Sources about said user.

In some embodiments, the Matching Unit further comprises: a Trustworthiness and Suspiciousness Indicators Detector Unit, configured to perform analysis of content of said Internet Sources and analysis of statistical data about said Internet Sources, and to deduce from them one or more Trustworthiness Indicators or Suspiciousness Indicators; and to generate a Overall Identity Match Probability Determination based on said Trustworthiness Indicators or Suspiciousness Indicators and based on said Combined Weighted Score.

In some embodiments, a computerized method comprises: receiving from a user a user-submitted biometric data-item of said user; receiving from said user one or more user-submitted data-items of Personally Identifiable Information (PII); generating an aggregated data-item that comprises (i) at least a portion of the user-submitted biometric data-item and (ii) at least a portion of the one or more user-submitted data-items of Personally Identifiable Information (PII); performing irreversible one-way cryptographic hashing of said aggregated data-item into an irreversible tokenized data-item that enables user authentication based on biometric data and PII data.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

The invention claimed is:

1. A system comprising:
a Tokenization Unit, that is configured:
(a) to receive from a user a user-submitted biometric data-item of said user,
  wherein the user-submitted biometric data-item comprises at least one of:
  a selfie image, a selfie video, a fingerprint,
  a voice sample, a retina scan, a face image,
(b) to receive from said user one or more user-submitted data-items of Personally Identifiable Information (PII),
(c) to generate an aggregated data-item that comprises (i) only a portion, and not an entirety, of the user-submitted biometric data-item and (ii) only a portion, and not an entirety, of the one or more user-submitted data-items of Personally Identifiable Information (PII),
(d) to activate a Computerized Data Collector Unit, which comprises at least a hardware processor and a memory unit and which is communicatively connected to the Internet via one or more communication links, to collect from an Internet Source one or more user-related Internet-obtained data-items, based on at least one of: said user-submitted biometric data-item, said Personally Identifiable Information (PII) data-item,
(e) at a Matching Unit, to compare the user-submitted biometric data-item of said user to said one or more user-related Internet-obtained data-items that were obtained from said Internet Source,
  wherein the Matching Unit comprises a Correlation Score Determination Unit, that is configured to generate a First Correlation Score indicating a level of correlation between: (i) the user-submitted biometric data-item, and (ii) information about said user as collected from said Internet Source,
  wherein said Correlation Score Determination Unit is further configured to generate a Second Correlation Score indicating a level of correlation between: (i) the user-submitted Personally Identifiable Information (PII), and (ii) information about said user as collected from said Internet Source,
  and
(f) to perform irreversible one-way cryptographic hashing of said aggregated data-item into an irreversible tokenized data-item that enables user authentication based on biometric data and PII data.

2. The system of claim 1,
wherein the aggregated data-item further comprises a meta-data item that describes a property of said user-submitted biometric data-item.

3. The system of claim 1,
wherein the aggregated data-item further comprises a meta-data item that describes a property of an electronic device that was used for providing said user-submitted biometric data-item.

4. The system of claim 1, further comprising:
a re-verification unit, that is configured
to receive a fresh biometric data-item and a fresh PII data-item that allegedly belong to said user,
to generate from said fresh biometric data-item and said fresh PII data-item a fresh tokenized data-item which is compared against said irreversible tokenized data-item to authenticate said user or a current usage session of said user.

5. The system of claim 1,
wherein the Matching Unit comprises
a Reliability Score Determination Unit, configured to generate a Reliability Score indicating an overall trustworthiness of the Internet Source from which said one or more data-items are obtained.

6. The system of claim 5,
wherein the Matching Unit comprises
a Uniqueness Score Determination Unit, configured to generate a Uniqueness Score that indicates a likelihood of an accurate biometric match between (i) the user-submitted biometric data-items and (ii) a matching biometric data-item obtained from said Internet Source.

7. The system of claim 6,
wherein the Matching Unit comprises
an Activity Score Determination Unit, configured to generate an Activity Score that indicates a level of change-over-time of content of said Internet Source.

8. The system of claim 7,
wherein the Matching Unit comprises
a History Score Determination Unit, configured to generate a History Score indicating a length of time that information, which was obtained from said Internet Source and appears to be matching said user, has been accessible on the Internet.

9. The system of claim 8,
wherein the Matching Unit comprises
a Combined Weighted Score Determination unit, configured to generate a Combined Weighted Score based on (i) said Reliability Score and (ii) said Uniqueness Score and (iii) said Activity Score and (iv) said First Correlation Score and (v) said Second Correlation Score and (vi) said History Score.

10. The system of claim 9,
wherein the Combined Weighted Score Determination unit further takes into account a Diversity and Variety Score,
which indicates a diversity of types of Internet Sources from which data-items about said user were obtained.

11. The system of claim 10,
wherein the Combined Weighted Score Determination unit further takes into account a Consistency Score,
which indicates a level of internal consistency in content of two or more data-items that were obtained from Internet Sources about said user.

12. The system of claim 11,
wherein the Matching Unit further comprises
a Trustworthiness and Suspiciousness Indicators Detector Unit, configured to perform analysis of content of said Internet Sources and analysis of statistical data about said Internet Sources, and to deduce from them one or more Trustworthiness Indicators or Suspiciousness Indicators; and to generate an Overall Identity Match Probability Determination based on said Trustworthiness Indicators or Suspiciousness Indicators and based on said Combined Weighted Score.

13. A computerized method comprising:
(a) receiving from a user a user-submitted biometric data-item of said user,
wherein the user-submitted biometric data-item comprises at least one of:
a selfie image, a selfie video, a fingerprint,
a voice sample, a retina scan, a face image,
(b) receiving from said user one or more user-submitted data-items of Personally Identifiable Information (PII),
(c) generating an aggregated data-item that comprises (i) only a portion, and not an entirety, of the user-submitted biometric data-item and (ii) only a portion, and not an entirety, of the one or more user-submitted data-items of Personally Identifiable Information (PII),
(d) activating a Computerized Data Collector Unit, which comprises at least a hardware processor and a memory unit and which is communicatively connected to the Internet via one or more communication links, to collect from an Internet Source one or more user-related Internet-obtained data-items, based on at least one of: said user-submitted biometric data-item, said Personally Identifiable Information (PII) data-item,
(e) at a Matching Unit, comparing the user-submitted biometric data-item of said user to said one or more user-related Internet-obtained data-items that were obtained from said Internet Source,
generating a First Correlation Score indicating a level of correlation between: (i) the user-submitted biometric data-item, and (ii) information about said user as collected from said Internet Source,
generating a Second Correlation Score indicating a level of correlation between: (i) the user-submitted Personally Identifiable Information (PII), and (ii) information about said user as collected from said Internet Source,
and
(f) performing irreversible one-way cryptographic hashing of said aggregated data-item into an irreversible tokenized data-item that enables user authentication based on biometric data and PII data.

* * * * *